(12) United States Patent
Vaughn

(10) Patent No.: US 7,971,012 B2
(45) Date of Patent: Jun. 28, 2011

(54) MAIL PROCESSING COMPUTER AUTOMATIC RECOVERY SYSTEM AND METHOD

(75) Inventor: Kenneth R. Vaughn, Cypress, TX (US)

(73) Assignee: Pitney Bowes Inc., Stamford, CT (US)

( * ) Notice: Subject to any disclaimer, the term of this patent is extended or adjusted under 35 U.S.C. 154(b) by 1044 days.

(21) Appl. No.: 11/803,423

(22) Filed: May 15, 2007

(65) Prior Publication Data

US 2008/0288734 A1  Nov. 20, 2008

(51) Int. Cl.
*G06F 12/00* (2006.01)
*G06F 11/00* (2006.01)

(52) U.S. Cl. ............................. 711/162; 714/5

(58) Field of Classification Search ............... 711/162, 711/154–173; 714/5–9, 718–723
See application file for complete search history.

(56) References Cited

U.S. PATENT DOCUMENTS

| | | | |
|---|---|---|---|
| 6,175,904 B1 * | 1/2001 | Gunderson | 711/162 |
| 7,155,633 B2 * | 12/2006 | Tuma et al. | 714/5 |
| 7,707,259 B2 * | 4/2010 | Ouchi | 709/206 |
| 2002/0107877 A1 * | 8/2002 | Whiting et al. | 707/204 |
| 2008/0155216 A1 * | 6/2008 | Shoham | 711/162 |

OTHER PUBLICATIONS

EMC Retrospect 7.5—EMC—insignia, Backup and Recovery Software"Data Protection for Small and Medium Business," 2006, downloaded from www.emcinsignia.com.

EMC² (where information lives), White Paper "Backing Up to External Hard Drives", Oct. 2006, downloaded from www.emcinsignia.com.

"EMC Retrospect for windows user's Guide", 2006 47 pages from 390 pages, downloaded from www.emcinsignia.com/assets/en_rug_win75.pdf.

* cited by examiner

*Primary Examiner* — Daniel Robinson
(74) *Attorney, Agent, or Firm* — Michael J. Cummings; Charles R. Malandra, Jr.

(57) ABSTRACT

An improved method and system to return a mail processing control computer back into operation after a hard drive failure. A first phase is a back-up process for the primary drive of the mail processing computer. A second phase is the recovery process when a primary hard drive failure occurs. The back-up process includes copying the primary drive to be protected to a spare backup drive. The data copied to the backup drive reflects data of the primary drive at a particular point in time. Once the backup drive is installed, the machine returns to normal operation. In the course of normal operation, incremental changes to the primary hard drive are recorded to a backup computer. When there is a failure of the primary drive, a new primary drive is installed in its place. An image of the backup drive is then copied to the new primary drive, thereby causing the new primary drive to reflect the original primary drive at the particular point in time. Next, the incremental changes recorded in the backup computer are updated to the primary drive from the backup computer.

7 Claims, 6 Drawing Sheets

MAIL PROCESSING COMPUTER AUTOMATIC RECOVERY SYSTEM AND METHOD

FIELD OF THE INVENTION

The present invention relates to a method for quickly and inexpensively recovering from a computer drive failure in equipment used for processing mail.

BACKGROUND OF THE INVENTION

Mail processing machinery may include one or more personal computers (PC's) for operational control and data processing. Mail processing machinery of this type may include mail sorters or mail production machines such as those available from Pitney Bowes Inc.

In an exemplary mail sorter machine, a Pitney Bowes Olympus II, there may be three internal PC's, and a further external PC, used for network functions. A first of the internal PC's is used for controlling the sorter transport mechanisms and hardware in accordance with predetermined sorting schemes. The two other internal computers are devoted to processor-intensive imaging and address reading functions. The external computer is referred to as a Remote Diagnostic Server (RDS). The RDS may be networked to a number of sorter machines and may also serve as the remote portal from which to provide remote diagnostics on the machines.

The computers associated with a mail processing machine typically have a baseline platform of software that controls the machine. However, as the machine is used, the baseline is continuously modified and updated with new instructions for controlling and monitoring operation of the machine. For example, in a sorter machine, new sorting schemes can be added, or changed, to suit different mail jobs, or the particular sorting objectives, that the machine is being used for. Also, information about the mail that is typically gathered and stored so that it can be analyzed and used for tracking productivity or for tracking mail. Different reports may be generated depending on the different uses of the machines.

From time to time the internal computers of the mail processing machines suffer a hard-drive failure. Consequently, the machine becomes inoperative and service must be called to repair the problem and/or replace the computer. Mail processing is often a critical aspect of a company's business, so any extended down-time can lead to unwanted expense and delay. In the past, one expeditious solution was thought to be to replace the computer with a new one that had the baseline platform software pre-loaded. However, the process of obtaining the computer, and reconfiguring the computer to match the specific computer that was being replaced could still take one or two working days. In some circumstances, even a delay of one day to bring the machinery back into operation can be costly in terms of productivity.

SUMMARY OF THE INVENTION

The improved method and system described herein provides recovery of a mail processing control computer back into operation after a hard drive failure. The improvement involves two phases. The first phase is a back-up process for the primary hard drive of the mail processing computer. The second phase is the recovery process when a primary hard drive failure occurs.

The back-up process includes copying the primary drive to be protected to a spare backup drive. The spare backup is preferably installed in the computer with the primary drive. The data copied to the backup drive reflects data of the primary drive at a particular point in time. In the preferred embodiment, the data and power cables to the backup drive are removed after the copying is complete. Once the backup drive is installed, the machine returns to normal operation. In the course of normal operation, incremental changes to the primary hard drive are recorded to a backup computer.

When there is a failure of the primary drive, a new primary drive is installed in its place. An image of the backup drive is then copied to the new primary drive, thereby causing the new primary drive to reflect the original primary drive at the particular point in time. Next, the incremental changes recorded on the backup computer are updated to the primary drive from the backup computer.

In a preferred embodiment, software for performing the incremental backup and for restoring the incremental backups is installed in the primary drive before it is copied to the backup drive. Also, the backup computer is equipped with the software for receiving and storing the incremental backup information.

BRIEF DESCRIPTION OF THE DRAWINGS

Reference is now made to the various figures wherein like reference numerals designate similar items in the various figures and in which.

DETAILED DESCRIPTION OF THE PREFERRED EMBODIMENT

Figure 1:
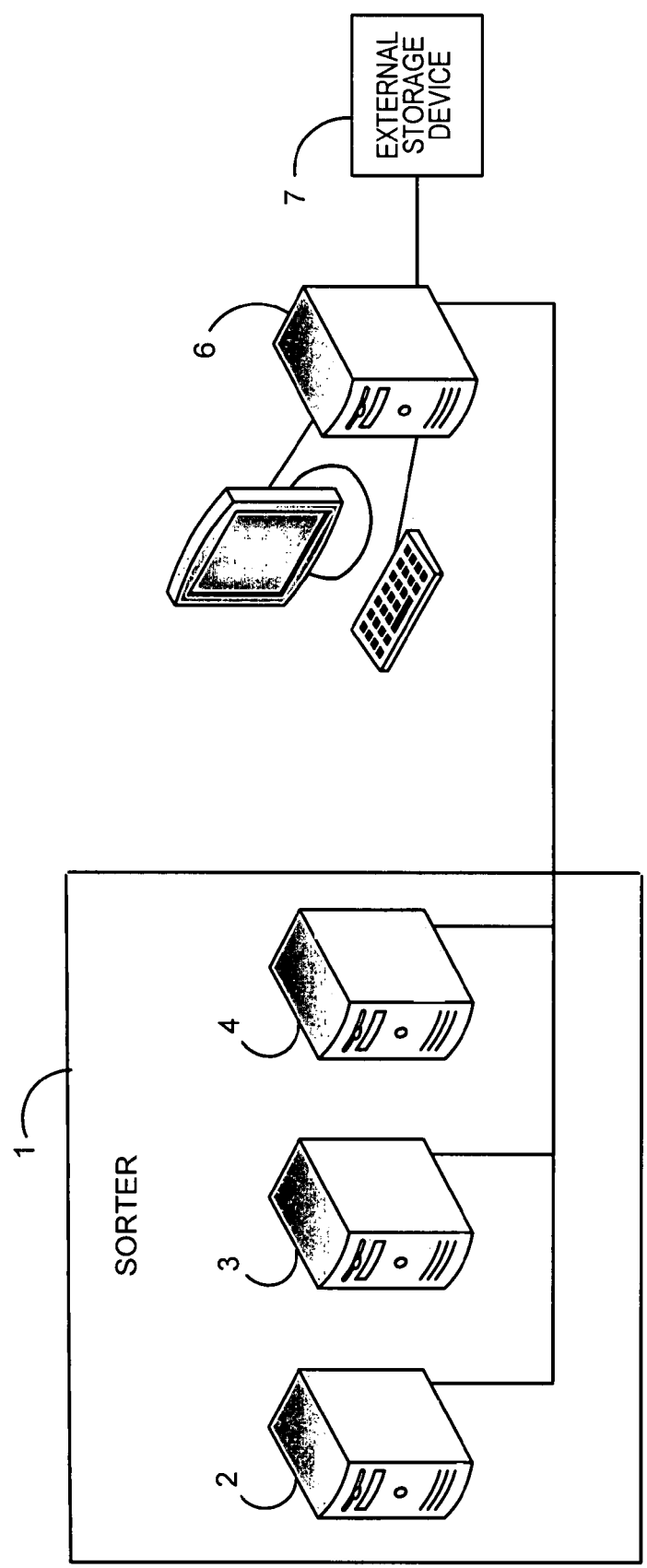
FIG. 1 depicts an exemplary mail sorting machine including a plurality of PC's.

An exemplary mail processing machine is depicted in FIG. 1, for which the improved recovery method of the present invention may be used. Sorter 1 is a mail sorter machine that is used for sorting mail pieces based on address information printed on the face of the mail. In this example, sorter 1 is configured to capture an image of the mail pieces being sorted. From the image, the address is interpreted and the envelope is sorted into an appropriate bin based on the address. Although a sorter has been selected for this description, other types of mail processing machines are contemplated as benefiting from this invention.

Sorter 1 is controlled by three internal computers 2-4. Transport computer 2 controls the sorter hardware for transporting and manipulating the mailpieces from the input to the respective sorting bins. Transport computer 2 typically includes the primary interface through which most operator functions are accessed. Image distribution computer 3 interfaces with a camera that captures images of the address blocks on mail pieces. This computer 3 converts the analog image to a digital image that can be encoded and processed to interpret the address information on the mail. Computer 4 is an image processing computer. This computer supplements the processing of digital images by the image distribution computer. Since sorter 1 may be required to operate at very high speed, the extra processing power of computer 4 may be required to convert the camera image to a digital image.

A remote diagnostic server (RDS) 6 is preferably located external to sorter 1. RDS 6 can be networked to multiple sorters 1, and may also serve as a portal for external support agents to access computers 2-4. In the preferred embodiment, RDS 6 also serves as a receptacle for receiving incremental backup information from computers 2-4. Information from the RDS 6 may further be backed up on an external storage device 7. External storage device 7 may be any type of known backup storage device with appropriate software.

Figure 2:
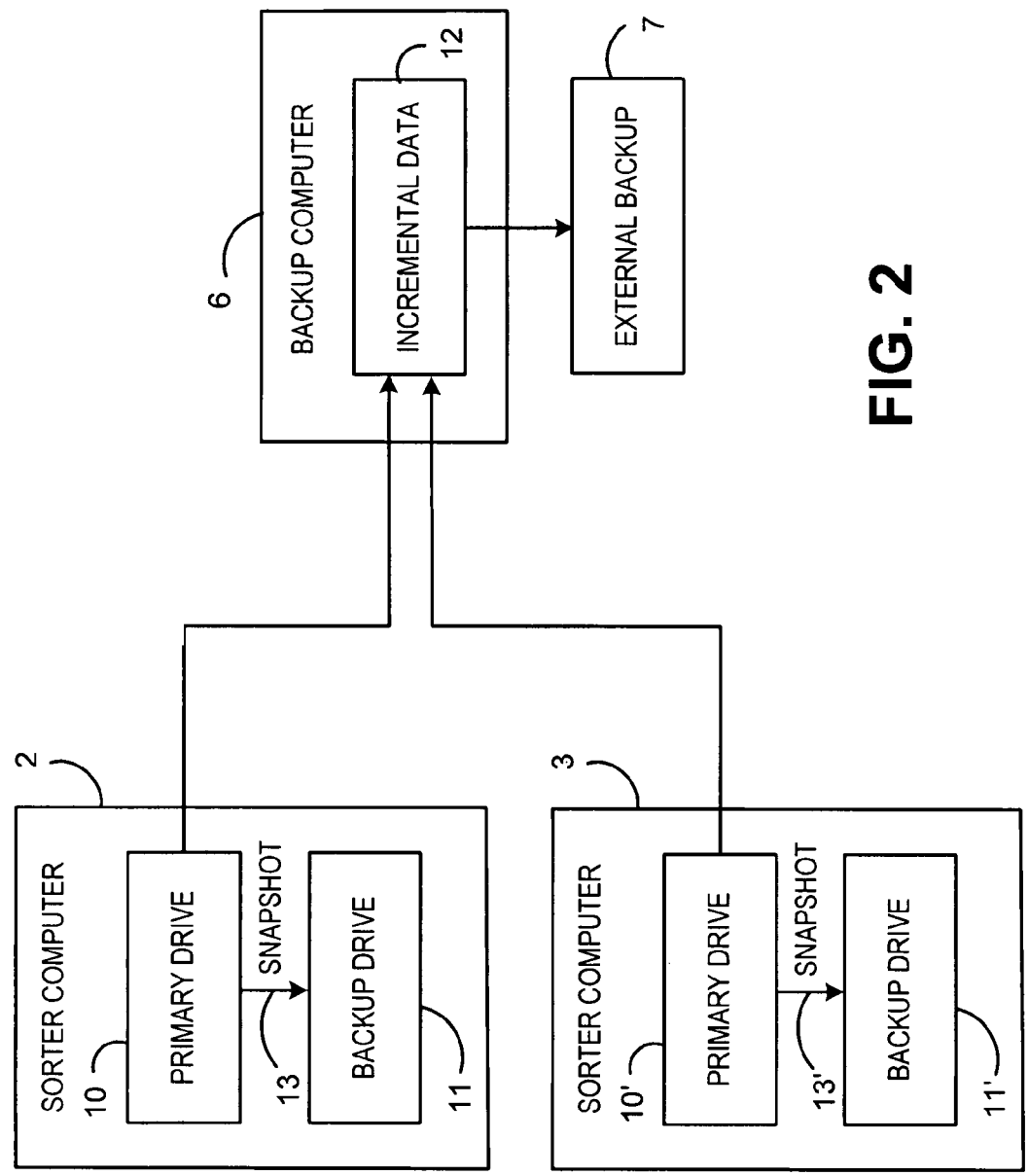
FIG. 2 depicts activity during a backup portion of the process.

The operation of the components in the backup stage of the recovery process are depicted in FIG. 2. In this example, computers 2 and 3 are being backed up using a backup computer, in this case RDS 6. A backup drive 11 is added to sorter computer 2. Backup drive 11 should be at least the same size as the primary drive 10, and be partitioned and formatted the same as the primary drive 10.

After backup drive 11 is installed, the primary drive 10 is copied to the backup drive 11 in a snapshot 13 at that particular point in time. In the preferred embodiment, the sorter computer is restarted after installing the backup drive using a floppy boot disk having a copying utility on it. An exemplary copy utility is Symantec's Norton Ghost utility. Known utilities can be used to create a boot disk that includes the copying software and that can be used during the copying process.

Once the primary drive 10 has been copied to the backup drive 11 it is preferred that the data and power cables to the backup drive 13 be disconnected. This prevents the backup drive 13 from being subject to wear so that it will be in good condition when it is needed in the future. A disadvantage of maintaining backup drive 13 as a continuously updated backup would be that the backup drive 13 would be undergoing the same wear and tear as the primary 10, and would therefore be subject to similar risks of failing.

After the backup drive 13 is installed and copied, the sorter computer 2 is returned to normal operation, with the primary drive 10 performing its respective duties in the operation of the machine. As new instructions are provided to the sorter 12, and as data is recorded for new mail pieces, these incremental changes occurring after the time of the snapshot 13 are recorded to a storage device 12 in the backup computer 6. Backup computer 6 is configured to receive data from all of the backed up sorter computers 2 and 3 that are being protected in accordance with the present invention.

Techniques and software for incremental backup of data are known, and need not be described here. One example of commercially available software is EMC Retrospects® backup and recovery software, available from $EMC^2$ Insignia. Preferably, the incremental backup software is installed on the RDS 6 and the incremental backup client software is installed on the primary drive 10 of the sorter computer 2, prior to making the copy of the primary drive 10 to the backup drive 11. This way, the backup drive 11 will already include the incremental backup software needed for the recovery stage of the process.

The incremental data 12 on the backup computer 6 may further be backed up on an external backup device 7. The external backup device 7 can be any conventional backup device that provides continuous copying of data. Device 7 is desirable because if incremental data 12 were lost, the recovery from failed primary drives 10 would become more difficult.

Figure 3:
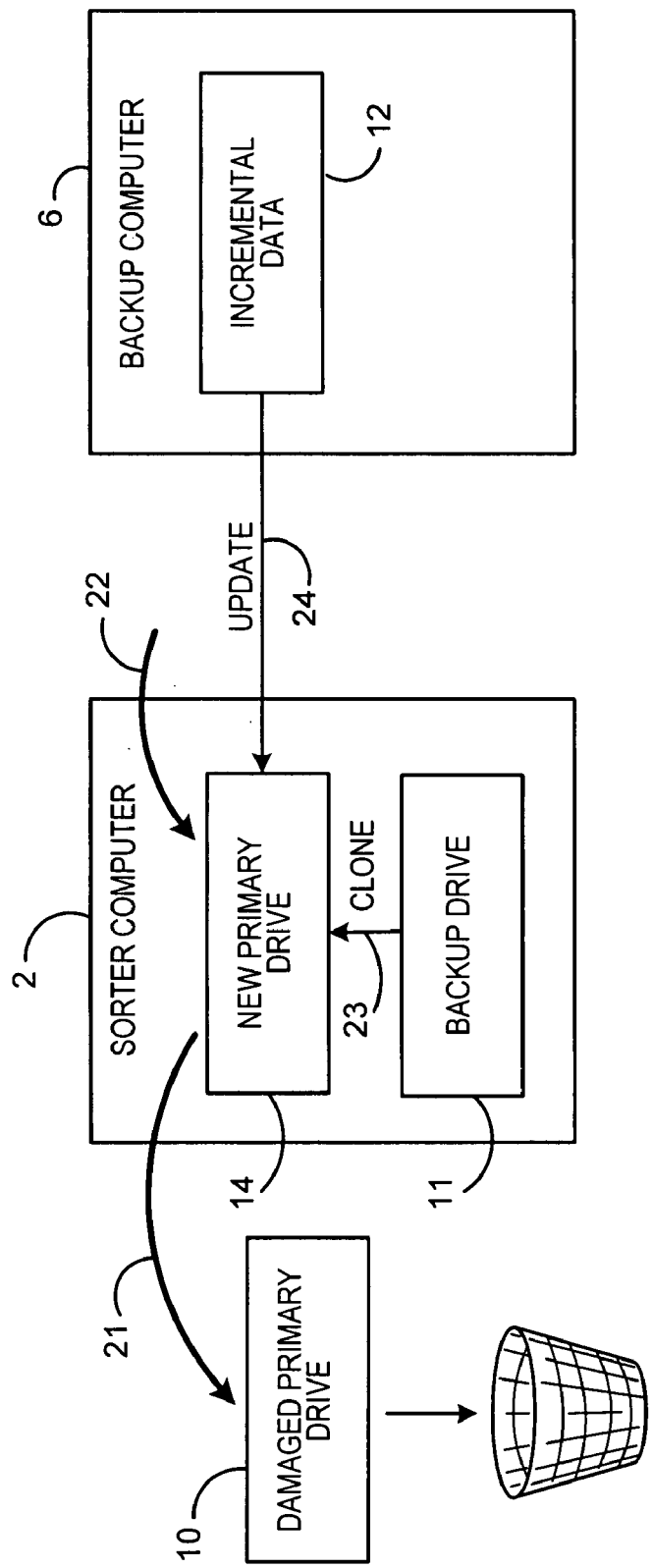
FIG. 3 depicts activity during a recovery portion of the process.

FIG. 3 depicts steps in the restoration process when primary drive 10 fails. As shown in FIG. 3, damaged primary drive 10 is physically removed via removal step 21. The new primary drive 14 is installed in the sorter computer 2 via installation step 22. At this time the data and power cables for the backup drive 11, if they had been removed as described above, are reconnected.

The backup drive 11 is then copied via cloning step 23 to the new primary drive 14. As described above, the preferred technique for performing this copying is to boot the sorter computer 2 using a floppy disk that includes drive copying utilities.

Once the data from the backup drive 11 is placed on the new primary drive 14, the incremental data 12 from backup computer 6. The data copied to the new primary drive 14 from backup drive 11 will preferably already include the client portion of the incremental backup software, so that updating of the incremental data can begin immediately. The incremental data 12 from backup computer 6 includes all the changes to the data from the time that the backup drive 11 was made to include all of the changes from that time, to the most recent incremental data that was saved. Thus, the improved method includes the use of two backup sources, backup drive 11 and the incremental data 12 to efficiently, quickly, and cheaply return the mail processing equipment 1 back to service.

Figure 4:
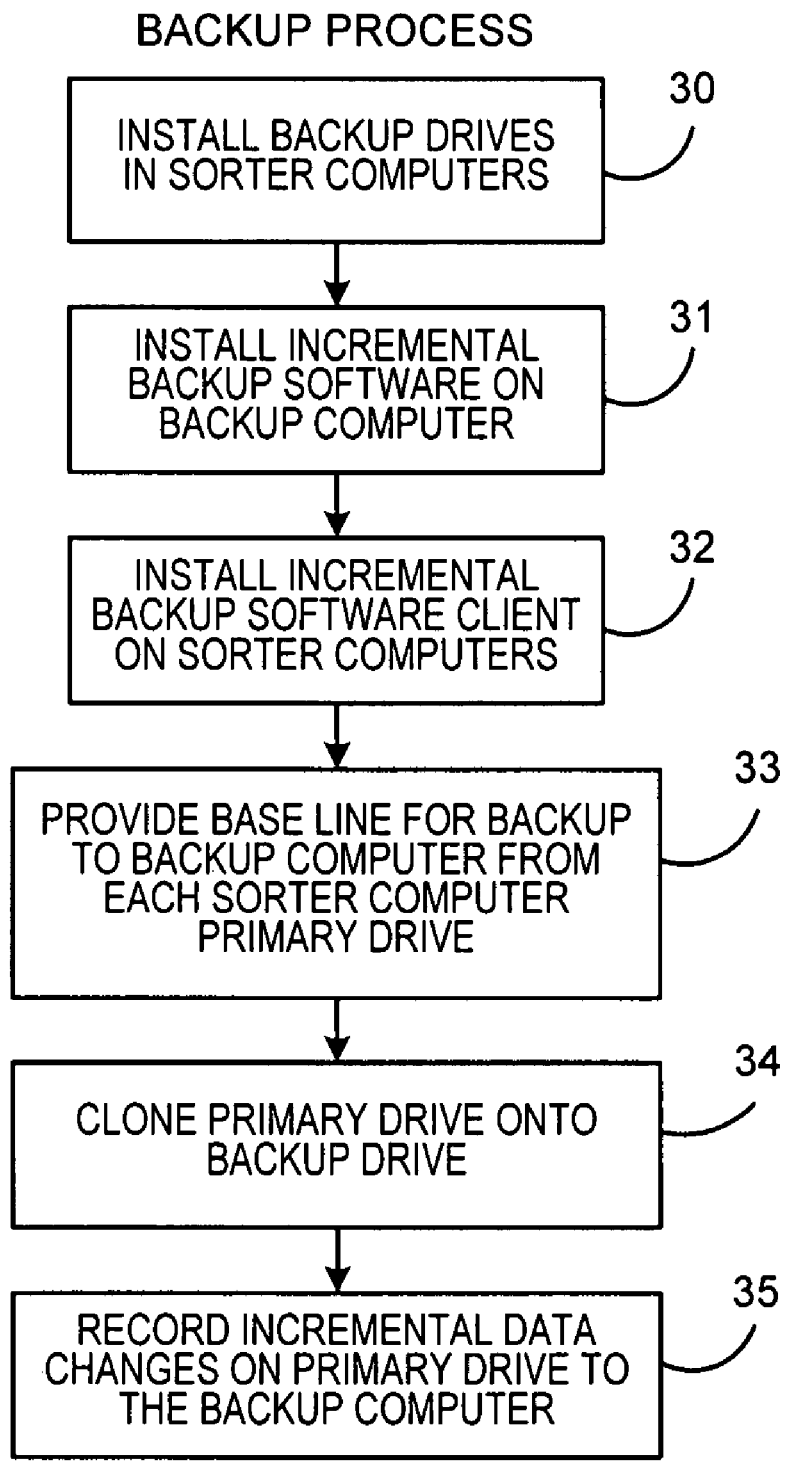
FIG. 4 is an exemplary flow diagram for the backup process.

FIG. 4 depicts a potential flow for performing the steps making up the preliminary backup portion of the improved process. In this embodiment, a first step 30 is to install the backup drives 11 in the sorter computers. In steps 31 and 32 the incremental backup software is installed on the backup computer 6 and on the sorter computers 2. The order of steps 30-32 is not significant. Next, at step 33, the primary drive 10 is copied to the backup drive 11. This copying provides a baseline for future rapid recovery when the primary drive 10 fails. Next at step 35 incremental data changes to the primary drive 10 are continuously, or periodically, gathered by the incremental backup software transmitted and stored on the backup computer 6.

Figure 5:
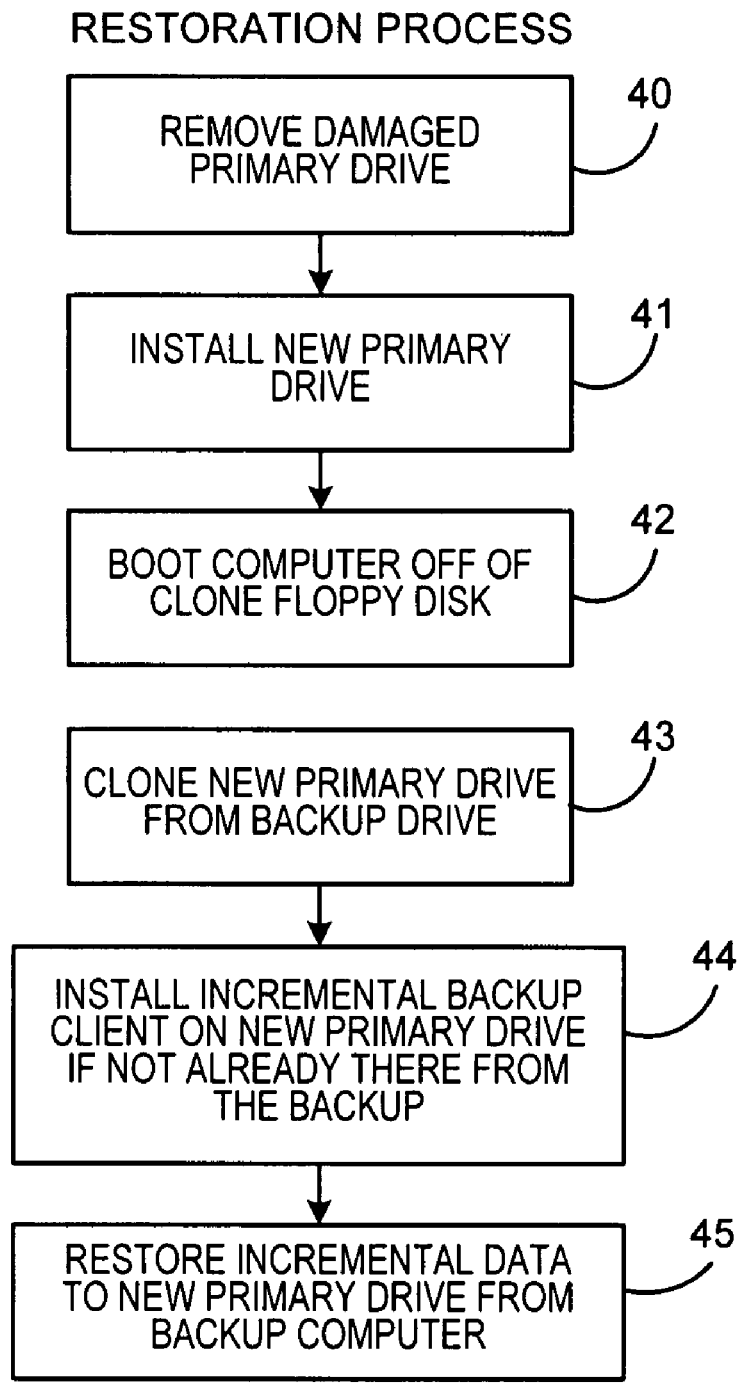
FIG. 5 is an exemplary flow diagram for the restoration process.

FIG. 5 depicts a potential flow for steps to restore the mail processing computer back into operation. At steps 40 and 41, the damaged primary drive 10 is removed, and a new primary drive 14, having the same specifications, is installed. Next, the sorter computer 2 is booted off of a floppy disk having drive copying utilities (step 43). Using the copying utilities, the new primary drive 14 is cloned from the backup drive 11 (step 44). Finally, the incremental backup software on the new primary drive 14, and on the backup computer is used to update the new primary drive with all of the changes that occurred on the old primary drive 10, up until the time that it failed.

Although in the preferred embodiment describes the new drive 14 is used as the new primary drive for ongoing operation of the sorter computer 2, it is also possible that the backup drive 11 could be converted to the new primary operating drive, and be used on an ongoing basis. After the backup drive 11 and new drive 14 are cloned to one another, they may be used interchangeably.

Figure 6:
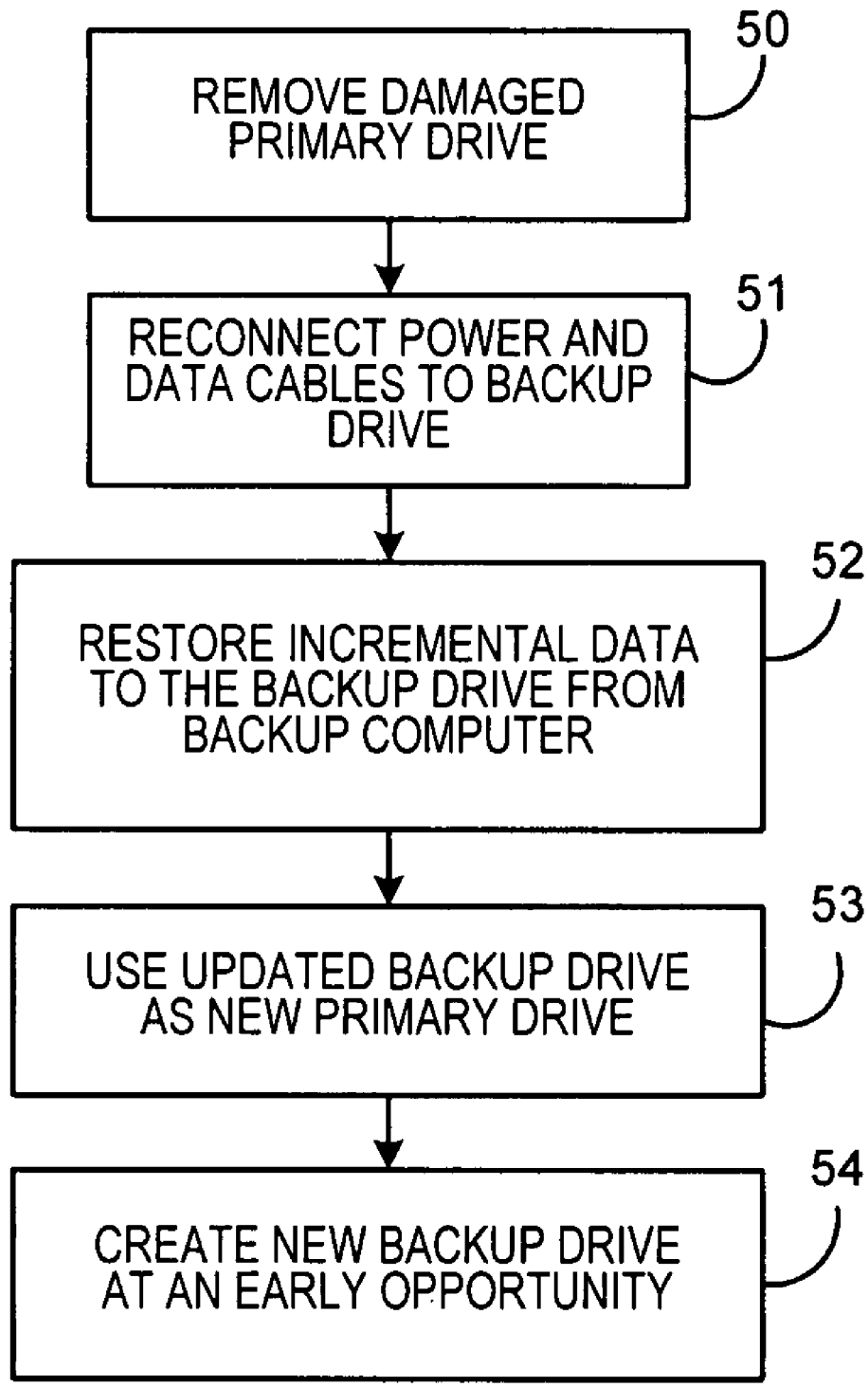
FIG. 6 is an exemplary flow diagram for an alternative recovery process.

An alternative recovery process is depicted in FIG. 6, whereby the creation of a further backup drive 11 is delayed during the recovery stage of the process. In this embodiment, the damaged primary drive is removed (step 50). However, instead of immediately installing a new primary drive and making another backup (steps 41-43, FIG. 5), the former backup drive will be immediately converted for use as the new primary drive. The power and data cables are reconnected to the backup drive, and upon rebooting, the incremental data from the backup computer is updated the backup drive (steps 51, 52). Thus, the updated backup drive may now be used as the new primary drive for ongoing operations (step 53). For a period of time, the sorter computer 2 may operate without a new backup drive 11 in place. At a later opportunity, a new backup drive 11 can be created by cloning it from a new backup drive.

This alternate embodiment introduces a risk by having the sorter computer 2 operate without backup drive 11 readily available. However, this option may be appropriate when no new drive is available, and it is urgent to return the mail processing equipment 1 back to operation.

Using the techniques described herein, it has been found that the recovery process for returning a mail processing machine to service can be shortened from a matter of days and hours, to a matter of hours and minutes. The present invention avoids any necessity of re-installing software, which can be a cumbersome and time consuming process. The creation of an backup drive 11 that is not continuously being updated in parallel with the primary drive 10 allows the backup drive 11 to avoid the wear and tear that may eventually cause the primary drive to fail. Finally, the use of incremental data 12 to update the copied backup drive 11 from a particular point in time, allows for quick updates, since in a sorter computer, only a fraction of the data will have changed over a likely time period. Efficiencies are also gained by allowing the backup computer 6 to gather the incremental data for multiple sorter computers.

While the present invention has been described in connection with what is presently considered to be the most practical and preferred embodiments, it is to be understood that the invention is not limited to the disclosed embodiment, but, on the contrary, is intended to cover various modifications and equivalent arrangements included within the spirit and scope of the appended claims.

What is claimed is:

1. A recovery method in a mail processing system for recovering from a failure of a primary drive of a mail processing computer, the method comprising:
   copying the primary drive to a backup drive, said copying reflecting data of the primary drive at a particular point in time;
   recording incremental changes of the primary hard drive to a backup computer;
   upon failure of the primary drive, replacing the primary drive with a new primary drive;
   copying the backup drive to the new primary drive;
   updating the recorded incremental changes from the backup computer to the new primary drive;
   installing and maintaining the backup drive in the mail processing computer;
   disconnecting power and data cables from the backup drive after the step of copying the primary drive to the backup computer, and
   reconnecting power and data cables prior to copying the backup drive to the new primary drive.

2. The recovery method of claim 1 further including a step of rebooting the mail processing computer from a floppy drive after installing the backup drive, the floppy drive including a memory device having software for copying one disk drive to another.

3. The recovery method of claim 1 including a step of rebooting the mail processing computer from a floppy drive after installing the new primary drive, the floppy drive including a memory device having software for copying one disk drive to another.

4. The recovery method of claim 1 further including installing incremental backup software on the primary drive prior to copying to the backup drive, and configuring the incremental backup software to backup incremental data to the backup computer.

5. The recovery method of claim 4, after replacing the primary drive with the new primary drive, and copying the backup drive to the new primary drive, invoking a copy of the incremental backup software on the new primary drive to initiate incremental update of data on the new primary drive from the backup computer.

6. The recovery method of claim 1 wherein the step of updating incremental changes includes updating data recorded by the backup computer from the particular point in time until data recorded just prior to failure of the primary drive.

7. The recovery method of claim 1 wherein the step of recording incremental changes includes recording incremental changes for a plurality of networked mail processing computers to the backup computer.

* * * * *